(12) United States Patent
Yamada

(10) Patent No.: US 11,623,546 B2
(45) Date of Patent: Apr. 11, 2023

(54) SEAT SWITCH DEVICE

(71) Applicant: TOYO DENSO KABUSHIKI KAISHA, Tokyo (JP)

(72) Inventor: Hajime Yamada, Saitama (JP)

(73) Assignee: TOYO DENSO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/555,732

(22) Filed: Dec. 20, 2021

(65) Prior Publication Data

US 2022/0194265 A1  Jun. 23, 2022

(30) Foreign Application Priority Data

Dec. 23, 2020 (JP) .............................. JP2020-213882

(51) Int. Cl.
*B60N 2/02* (2006.01)
*B60N 2/22* (2006.01)
*B60N 2/06* (2006.01)

(52) U.S. Cl.
CPC ............. *B60N 2/0228* (2013.01); *B60N 2/06* (2013.01); *B60N 2/22* (2013.01)

(58) Field of Classification Search
CPC .................................................. B60N 2/0228
See application file for complete search history.

(56) References Cited

U.S. PATENT DOCUMENTS

| 9,446,690 B2* | 9/2016 | Shigematsu | ............. B60N 2/06 |
| 2014/0210239 A1* | 7/2014 | Yetukuri | ............. B60N 2/0228 |
| | | | 297/217.1 |
| 2018/0105069 A1* | 4/2018 | Nasca | ................... B60N 2/0228 |
| 2022/0153171 A1* | 5/2022 | Lee | ...................... H01H 23/143 |

FOREIGN PATENT DOCUMENTS

| CN | 113002379 A | * | 6/2021 | |
| DE | 102017219128 A1 | * | 4/2018 | ............. H01H 23/04 |
| DE | 102018219787 A1 | * | 5/2020 | |
| DE | 102018219793 A1 | * | 5/2020 | |
| DE | 102021201262 A1 | * | 8/2022 | |
| JP | 10000969 A | * | 1/1998 | .......... B60N 2/0228 |
| JP | 2008-135324 A | | 6/2008 | |
| JP | 2010-244961 A | | 10/2010 | |
| WO | WO-2016031321 A1 | * | 3/2016 | .......... B60N 2/0228 |
| WO | WO-2020182861 A1 | * | 9/2020 | .......... B60N 2/0228 |

* cited by examiner

*Primary Examiner* — Timothy J Brindley

(74) *Attorney, Agent, or Firm* — IP Business Solutions, LLC

(57) ABSTRACT

A seat switch device performing an operation on the component of a vehicle seat according to the present invention includes an operation unit attached in a movable manner so as to be located at a plurality of operation positions. The operation unit is configured to accept an operation input when the operation unit is located at each of the operation positions as an operation on each of the component of the seat for the vehicle located corresponding to a positional relation of the operation position.

13 Claims, 8 Drawing Sheets

SEAT SWITCH DEVICE

INCORPORATION BY REFERENCE

This application is based upon and claims the benefit of priority from Japanese patent application No. 2020-213882, filed on Dec. 23, 2020, the disclosure of which is incorporated herein in its entirety by reference.

TECHNICAL FIELD

The present invention relates to a seat switch device that performs an operation on the components of a vehicle seat.

BACKGROUND ART

A vehicle seat on which a passenger of an automobile is seated includes a sitting part and a backrest. The sitting part and the backrest are each configured to be actuated, such that its fore-and-aft position and vertical position are moved and its angle is changed, and a switch device that performs such actuation operations is arranged mainly on the side surface of the sitting part. In recent years, many operable actuation portions of the vehicle seat are set and, in accordance with this, a switch device capable of performing various operations with a small number of operation units has been considered. Examples of a switch device that performs an operation on a vehicle seat are disclosed in patent Documents 1 and 2.

To be specific, a switch device disclosed in Patent Document 1 is formed by a cylindrical operation unit. By rotating the operation unit around the axis, an actuation portion corresponding to the rotation position is selected. Moreover, by sliding and moving the operation unit in the radial direction, the selected actuation portion is actuated. Further, a switch device disclosed in Patent Document 2 is composed of a first operation knob having a substantially rectangular parallelepiped shape and a second operation knob having a cylindrical shape that are arranged so as to overlap each other. By operating the first operation knob so as to slide or swing and operating the second operation knob so as to rotate, a corresponding actuation portion is actuated.
Patent Document 1: Japanese Unexamined Patent Application Publication No. JP-A 2008-135324
Patent Document 2: Japanese Unexamined Patent Application Publication No. JP-A 2010-244961

However, the switch devices disclosed in Patent Documents 1 and 2 described above have a problem that it is difficult for the operator to recognize an actuation portion corresponding to an operation of the operation unit. For example, in Patent Document 1, the operator rotates the cylindrical operation unit around the axis to select an actuation portion corresponding to the rotation position. However, since the operator operates without seeing the operation unit, it is difficult to recognize an actuation portion corresponding to the rotation position of the operation unit. Further, in Patent Document 2, since the operator operates the two operation knobs without seeing, it is difficult for the operator to recognize actuation portions corresponding to operations on the respective operation knobs. Moreover, since the operator needs to perform a blind operation without seeing the operation unit, there arises a problem that the operation itself is difficult.

SUMMARY OF THE INVENTION

Accordingly, an object of the present invention is to solve the abovementioned problem that when an operator operates the components of a vehicle seat, it is difficult to recognize an actuation portion corresponding to an operation of a seat switch device.

A seat switch device according to an aspect of the present invention is a seat switch device performing an operation on a component of a seat for a vehicle. The seat switch device includes an operation unit attached in a movable manner so as to be located at a plurality of operation positions. The operation unit is configured to accept an operation input when the operation unit is located at each of the operation positions as an operation on each of the component of the seat for the vehicle located corresponding to a positional relation of the operation position.

With the configuration as described above, the present invention can provide a seat switch device that, when an operator performs an operation on the components of a vehicle seat, allows the operator to easily recognize an actuation portion corresponding to the operation.

EXAMPLE EMBODIMENT

First Example Embodiment

Figure 1:
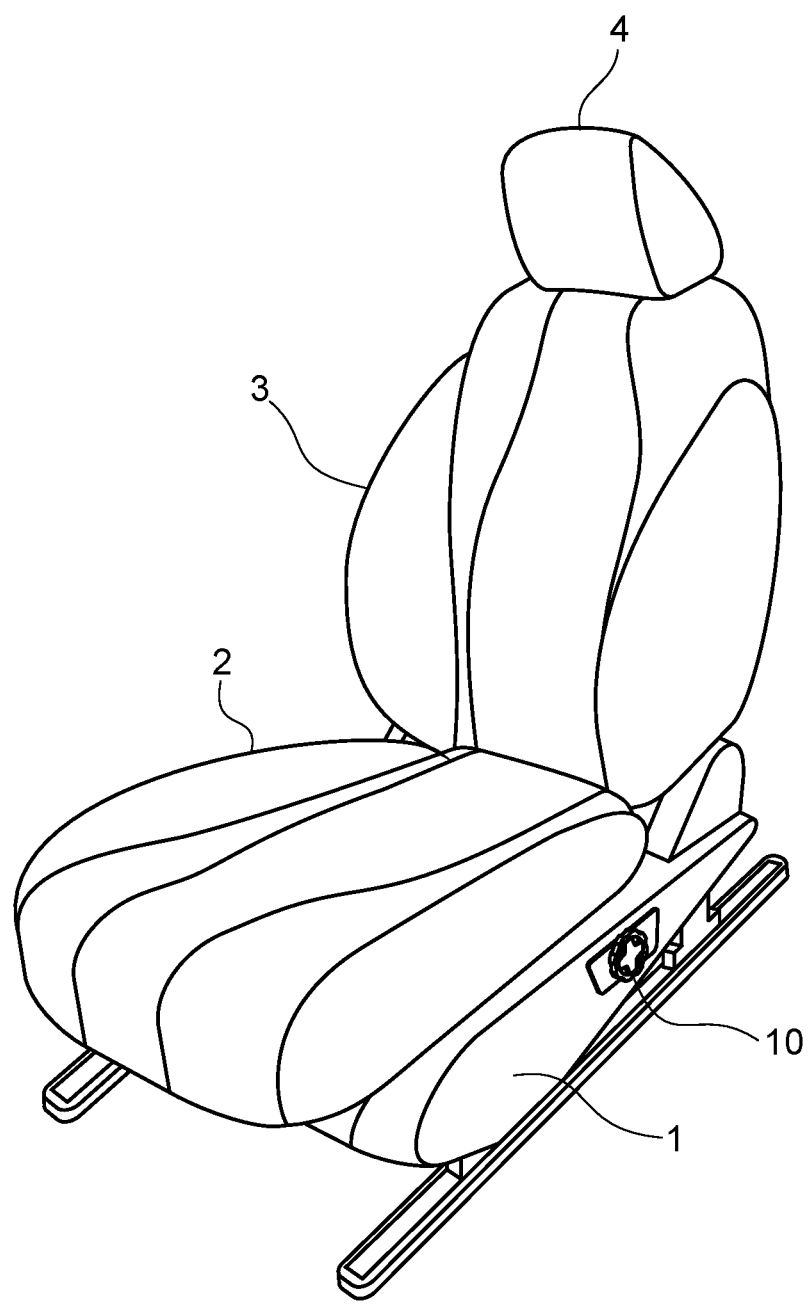
FIG. 1 is a view showing an entire configuration of a vehicle seat to which a seat switch device is attached in a first example embodiment of the present invention.
Figure 2:
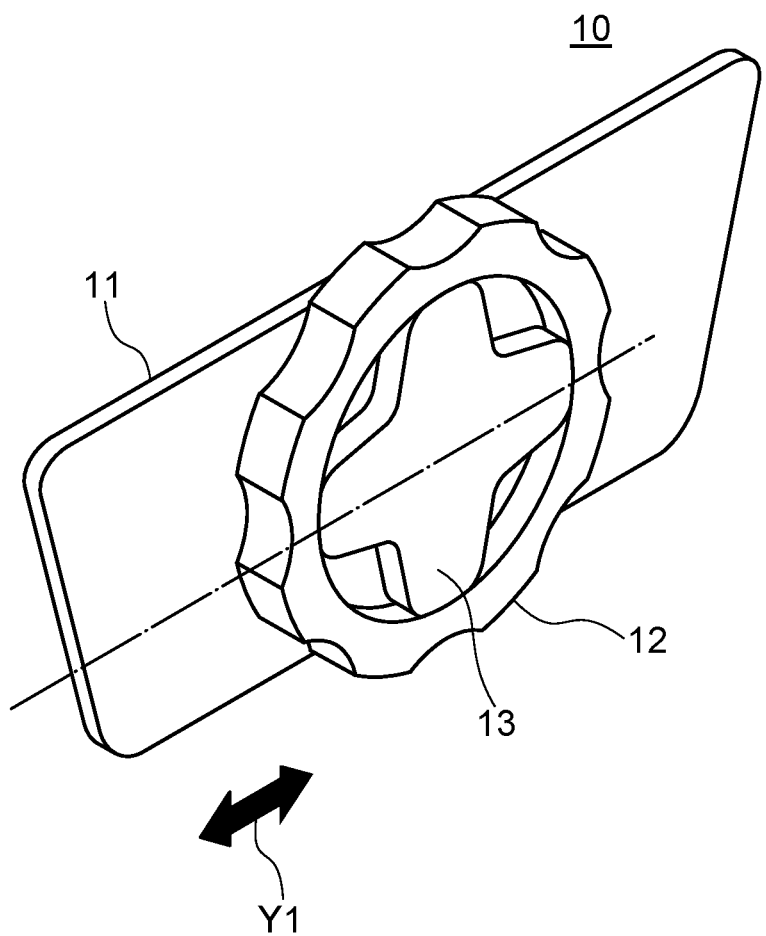
FIG. 2 is an appearance view of the seat switch device disclosed in FIG. 1.

A first example embodiment of the present invention will be described with reference to FIGS. 1 to 6. FIG. 1 is a view for describing a configuration of a vehicle seat, and FIG. 2 is a view for describing a configuration of a seat switch device. FIGS. 3 to 6 are views for describing an operation of the seat switch device and a motion of the vehicle seat.

A seat switch device 10 according to the present invention is for an operator who is a seated passenger to operate a vehicle seat installed in a vehicle. Herein, a vehicle seat is, for example, a seat which is installed in a vehicle such as a four-wheeled vehicle and on which a passenger is seated. As shown in FIG. 1, the vehicle seat includes a base part 1 placed on the floor surface of the vehicle, a sitting part 2 arranged on the base part 1, a backrest 3 arranged at the back of the sitting part 2, and a headrest part 4 arranged on the top of the backrest 3 as the components. In FIG. 1, the leftward direction is the forward direction of the vehicle, the rightward direction is the backward direction of the vehicle, and the vertical direction is the vertical direction of the vehicle.

The base part 1 included by the vehicle seat is placed on the floor surface of the vehicle via rails, and is configured so that its position in the fore-and-aft direction of the vehicle can be moved along the rails. That is to say, the base part 1 is configured so that the mobility of the position of the base part 1 causes the position of the vehicle seat itself to move along the fore-and-aft direction of the vehicle as shown by arrow D1 in FIG. 4 and arrow D2 of FIG. 6.

Figure 6:
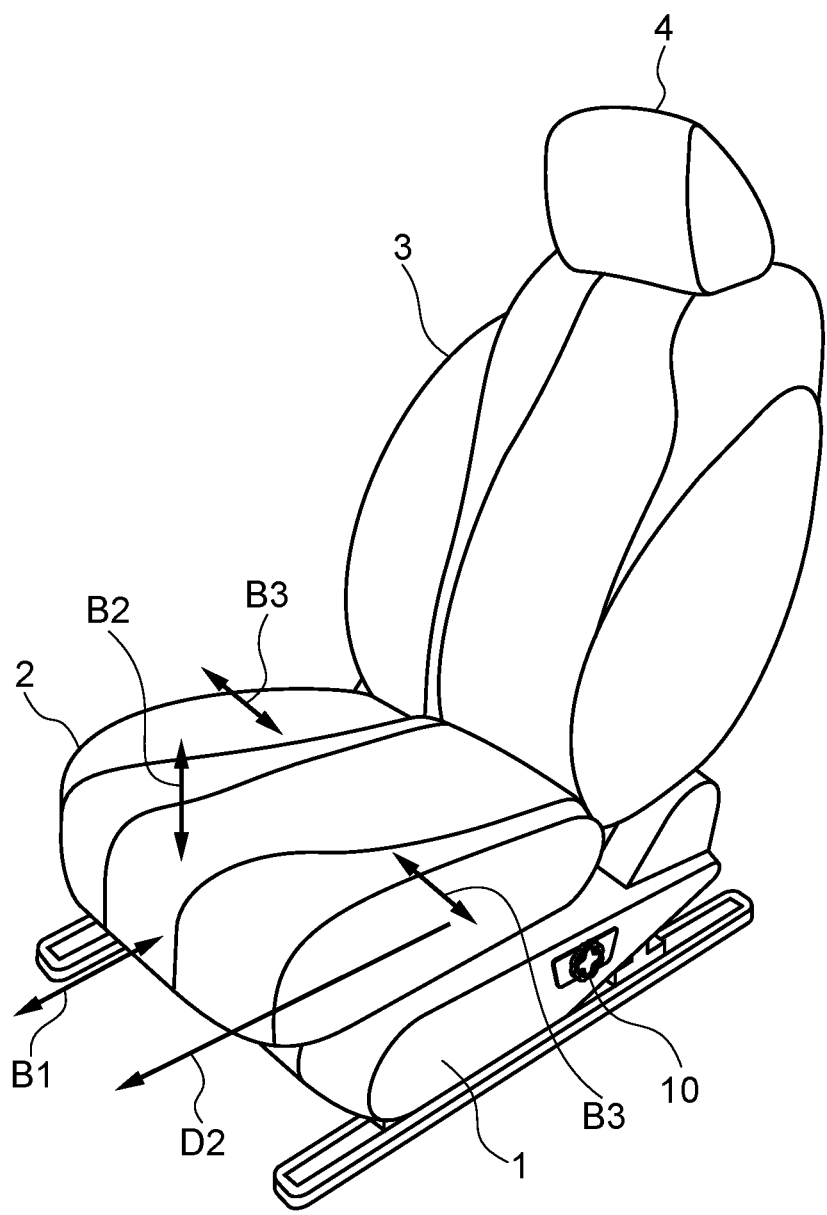
FIG. 6 is a view showing a motion of the vehicle seat by the operation of the seat switch device disclosed in FIG. 1.

The sitting part 2 included by the vehicle seat is arranged on the top of the base part 1, and forms a seat surface that a passenger is seated on its upper surface. As shown in FIG. 6, the sitting part 2 is configured so that its fore-and-aft position in the fore-and-aft direction of the vehicle (arrow B1), its height position in the vertical direction of the vehicle (arrow B2), and the breadth in the vehicle width direction of a passenger support member installed in the sitting part 2 (arrow B3) can be moved. The passenger support member of the sitting part 2 is a member which is installed in the sitting part 2 and supports the buttock of a passenger so as to sandwich from both sides in the width direction (widthwise direction), and its breadth can be made to be wider or narrower.

Figure 4:
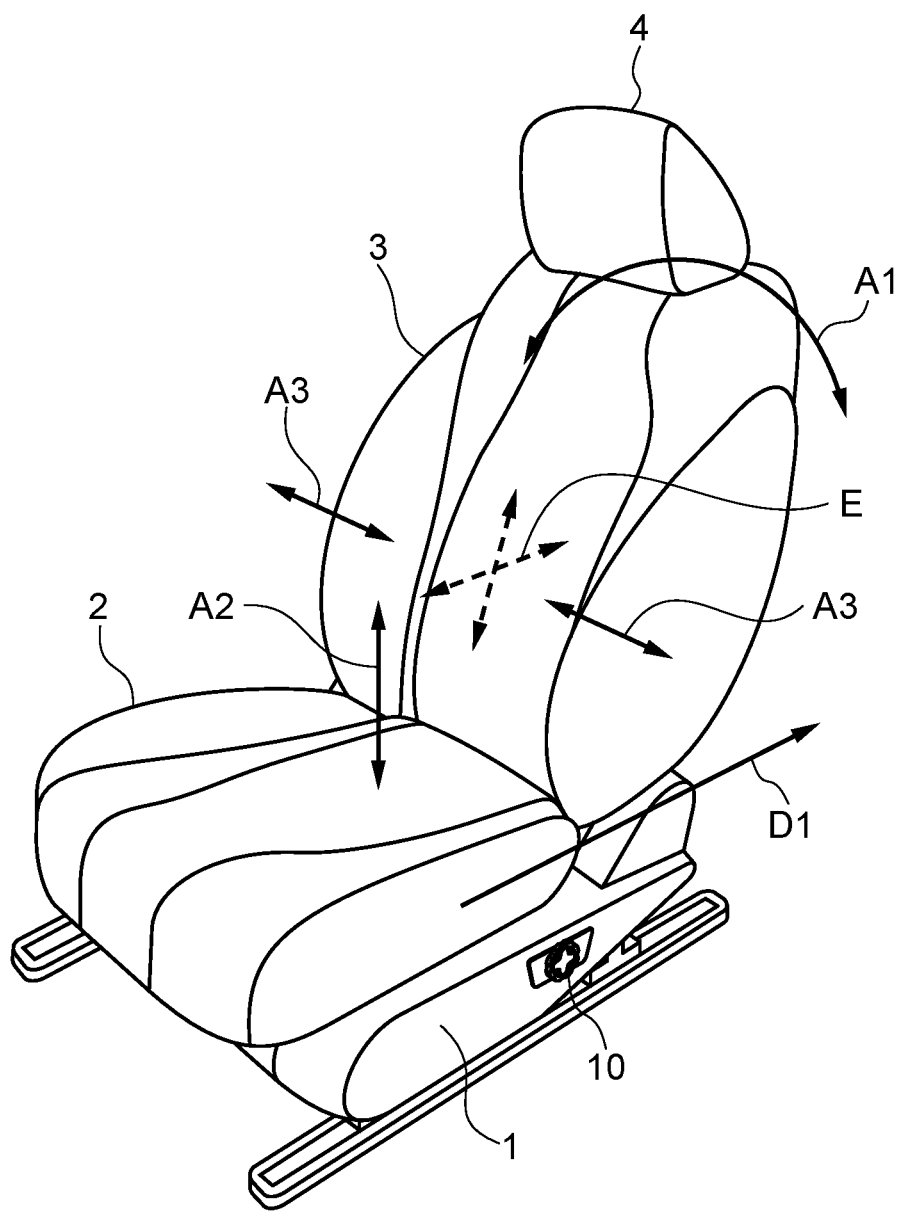
FIG. 4 is a view showing a motion of the vehicle seat by the operation of the seat switch device disclosed in FIG. 1.

The backrest 3 included by the vehicle seat is arranged at the back and on the top of the base part 1 and at the back of the sitting part 2 to form a backrest for the passenger. As shown in FIG. 4, the backrest 3 is configured so that its angular position along the fore-and-aft direction of the vehicle (arrow A1), its height position in the vertical direction of the vehicle (arrow A2), and the breadth in the vehicle width direction of a passenger support member installed in the backrest 3 (arrow A3) can be moved. The passenger support member of the backrest 3 is a member which is installed in the backrest 3 and supports the back of a passenger so as to sandwich from both sides in the width direction (widthwise direction), and its breadth can be made to be wider or narrower. Furthermore, the backrest 3 has a lumbar support (not shown) placed at a position of the passenger's waist, and the lumbar support is configured to be movable in the fore-and-aft direction and the vertical direction of the vehicle as shown by arrow E in FIG. 4. The headrest 4 supporting the passenger's head is arranged on the top of the backrest 3.

The base part 1, the sitting part 2, and the backrest 3 provided so as to be movable as mentioned above are moved by an electric drive device (not shown) installed in the vehicle seat. At this time, the electric drive device accepts an operation input into the seat switch device 10, and actuates movable sites of the base part 1, the sitting part 2 and the backrest 3 so as to come into an actuation state corresponding to the operation.

As shown in FIG. 1, the seat switch device 10 that operates to move the vehicle seat described above is placed on the side surface of the base part 1. In this example embodiment, the seat switch device 10 is placed on the left side surface of the base part 1 included by the vehicle seat, and is placed at a position where it can be operated with the passenger's left hand. However, the seat switch device 10 may be placed at any place of the vehicle seat, or may be placed at a place other than the vehicle seat.

As shown in FIG. 2, the seat switch device 10 includes a substantially plate-shaped switch base 11, a substantially cylindrical operation unit 12 mounted on the surface side of the switch base 11, and a sub operation unit 13 further mounted on the surface side of the operation unit 12. The switch base 11 is mounted so as to be movable in the fore-and-aft direction of the vehicle along the side surface of the base part 1 in a state in which an opposite surface to the surface with the operation unit 12 mounted faces the side face of the base part 1. That is to say, as shown by arrow Y1 in FIG. 2, the switch base 11 is moved on a substantially straight line along the fore-and-aft direction of the vehicle (a direction in which a long dashed dotted line extends in FIG. 2) by a passenger's manual operation. With this, the positions of the operation unit 12 and the sub operation unit 13 mounted on the switch base 11 are also moved along the fore-and-aft direction of the vehicle in accordance with the movement of the switch base 11. Then, by the movement of the position of the switch base 11, the operation unit 12 is located, for example, at a first operation position located on the backward side of the vehicle denoted by reference numeral 12A in FIG. 3 and at a second operation position located on the forward side of the vehicle denoted by reference numeral 12B in FIG. 5.

The switch base 11 is moved by a moving mechanism (not shown) installed in the vehicle seat in accordance with the passenger's manual operation. Then, the movement state of the switch base 11 is detected by, for example, an operation detection device (not shown) installed in the vehicle seat. That is to say, the operation detection device detects whether the switch base 11, that is, the operation unit 12 is located at the first operation position or at the second operation position.

Figure 3:
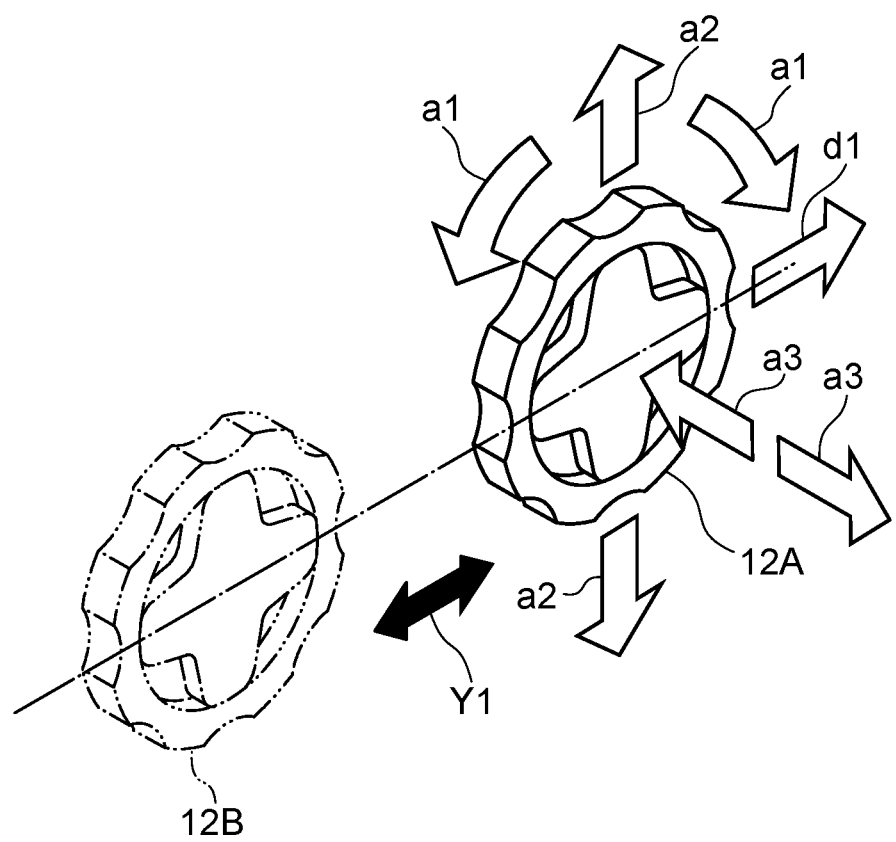
FIG. 3 is a view showing a way of an operation of the seat switch device disclosed in FIG. 1.
Figure 5:
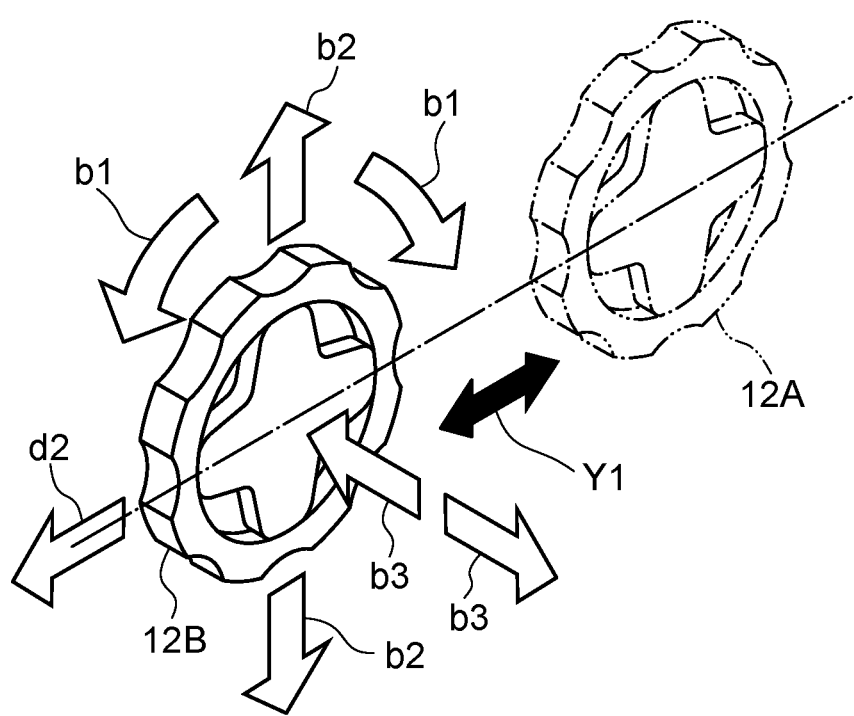
FIG. 5 is a view showing a way of an operation of the seat switch device disclosed in FIG. 1.

The operation unit 12 is formed in a substantially cylindrical shape and, as shown in FIG. 2, mounted on the switch base 11 so that an end surface in the height direction of a cylindrical site faces the width direction, that is, the widthwise direction of the vehicle. Then, the operation unit 12 is mounted on the switch base 11 so as to be able to perform a plurality of operations at the first operation position and the second operation position as shown in FIGS. 3 and 5, respectively. In the following, the operation unit 12 is denoted by reference numeral 12A when located at the first operation position shown in FIG. 3, and is denoted by reference numeral 12B when located at the second operation position as shown in FIG. 5.

First, the operation unit 12A located at the first operation position shown in FIG. 3 is configured to be able to perform a rotation operation (a fore-and-aft operation) to rotate in a rotation direction corresponding to the fore-and-aft direction of the vehicle with respect to the switch base 11 as shown by arrow a1. This rotation operation is performed by an operator who is the passenger pinching the outer periphery of the operation unit 12A and turning in the fore-and-aft direction. Moreover, the operation unit 12A is configured to be able to perform a vertical slide operation (a vertical operation) corresponding to the vertical direction of the vehicle with respect to the switch base 11 as shown by arrow a2. This vertical slide operation is performed by the operator sliding the operation unit 12A in the vertical radial direction, for example, pushing upward and pushing downward. Moreover, the operation unit 12A is configured to be able to perform a widthwise operation that is an operation corresponding to the width direction, that is, the widthwise direction of the vehicle with respect to the switch base 11 as shown by arrow a3. This widthwise operation is performed by the operator pushing or pulling the operation unit 12A in the axial direction of the operation unit 12A. Furthermore, the operation unit 12A is configured to, only when located at the first operation position, be able to perform a backward slide operation corresponding to the backward direction of the vehicle with respect to the switch base 11 as shown by arrow d1 in FIG. 3. This backward slide operation is performed by the operator pushing the operation unit 12A in the backward direction of the vehicle and sliding in the backward radial direction. The mobility of the operation unit 12 with respect to the switch base 11 by the abovementioned operations is realized by mounting a moving mechanism (not shown).

Then, each operation on the operation unit 12A located at the first operation position mentioned above is detected by an operation detection device (not shown), and the operation detection device accepts as an operation on the backrest 3 associated with the first operation position. To be specific, the operation detection device first accepts the rotation operation in the fore-and-aft direction on the operation unit 12A shown by arrow a1 in FIG. 3 as an operation of a rotation angle position to rotate about a lower end side of the backrest 3 along the fore-and-aft direction of the vehicle shown by arrow A1 in FIG. 4. With this, by an electric drive mechanism (not shown), the angle can be moved so that the backrest 3 inclines forward when the operation unit 12A is operated to rotate forward, and the angle can be moved so that the backrest 3 inclines backward when the operation unit 12A is operated to rotate backward. Moreover, the operation detection device accepts the vertical slide operation in the vertical direction on the operation unit 12A shown by arrow a2 in FIG. 3 as an operation of a height position of the backrest 3 along the vertical direction of the vehicle shown by arrow A2 in FIG. 4. With this, by an electric drive mechanism (not shown), the backrest 3 can be moved so as to ascend in the upward direction when the operation unit 12A is operated to slide in the upward direction, and the backrest 3 can be moved so as to descend in the downward direction when the operation unit 12A is operated to slide in the downward direction. Moreover, the operation detection device accepts an operation in the horizontal direction on the operation unit 12A shown by arrow a3 in FIG. 3 as an operation of a breadth in the width direction of the passenger support member of the backrest 3 shown by arrow A3 in FIG. 4. With this, by an electric drive mechanism (not shown), the width of the passenger support member of the backrest 3 can be moved so as to be broader when the operation unit 12A is operated in the leftward direction, and the width of the passenger support member of the backrest 3 can be moved so as to be narrower when the operation unit 12A is operated in the rightward direction. The operation detection device accepts a backward slide operation on the operation unit 12A shown by arrow d1 in FIG. 3 as an operation to move in the backward direction of the whole vehicle seat shown by arrow D1 in FIG. 3. With this, by an electric drive mechanism (not shown), the whole vehicle seat is caused to move backward when the operation unit 12A is operated to slide backward.

Then, the operation unit 12 is also configured to, when located at the second operation position as shown in FIG. 5, be able to perform almost the same operation as when located at the first operation position described above. That is to say, the operation unit 12B located at the second operation position shown in FIG. 5 is configured to be able to perform a rotation operation (a fore-and-aft operation) to rotate in a rotation direction corresponding to the fore-and-aft direction of the vehicle shown by arrow b1, a vertical slide operation (a vertical operation) corresponding to the vertical direction of the vehicle shown by arrow b2, and a widthwise operation that is an operation corresponding to the width direction, that is, the widthwise direction of the vehicle shown by arrow b3. Furthermore, the operation unit 12B is configured to, only when located at the second operation position, be able to perform a forward slide operation corresponding to the forward direction of the vehicle as shown by arrow d2 in FIG. 5. This forward slide operation is performed by the passenger pushing the operation unit 12B in the forward direction of the vehicle and sliding in the forward radial direction.

Each operation on the operation unit 12B located at the second operation position mentioned above is detected by an operation detection device (not shown), and the operation detection device accepts as an operation on the sitting part 2 associated with the second operation position. That is to say, when the operation unit 12 is located at the second operation position, each operation on the operation unit 12 is accepted as an operation on the sitting part 2 located on a side in a direction toward the second operation position (a second direction side) from the first operation position with respect to the backrest 3 mentioned above, and vice versa. When the operation unit 12 is located at the first operation side as described above, each operation on the operation unit 12 is accepted as an operation on the backrest 3 located on a side in a direction toward the first operation position (a first direction side) from the second operation position with respect to the sitting part 2.

To be specific, the operation detection device first accepts a rotation operation in the fore-and-aft direction on the operation unit 12B shown by arrow b1 in FIG. 5 as an operation of the fore-and-aft position of the sitting part 2 along the fore-and-aft direction of the vehicle shown by arrow B1 in FIG. 6. With this, by an electric drive mechanism (not shown), the sitting part 2 is caused to move in the forward direction when the operation unit 12B is operated to rotate in the forward direction, and the sitting part 2 is caused to move in the backward direction when the operation unit 12B is operated to rotate in the backward direction. Moreover, the operation detection device accepts a vertical slide operation in the vertical direction on the operation unit 12B shown by arrow b2 in FIG. 5 as an operation of the height position of the sitting part 2 along the vertical direction of the vehicle shown by arrow B2 in FIG. 6. With this, by an electric drive mechanism (not shown), the sitting part 2 is caused to move in the upward direction when the operation unit 12B is operated to slide in the upward direction, and the sitting part 2 is caused to move in the downward direction when the operation unit 12B is operated to slide I the downward direction. Moreover, the operation detection device accepts an operation in the widthwise direction on the operation unit 12B shown by arrow b3 in FIG. 5 as an operation of the breadth in the width direction of the passenger support member of the sitting part 2 shown by arrow B3 in FIG. 6. With this, by an electric drive mechanism (not shown), the sitting part 2 is caused to increase the width of the passenger support member of the sitting part 2 when the operation unit 12B is operated in the leftward direction, and the sitting part 2 is caused to decrease the width of the passenger support member of the sitting part 2 when the operation unit 12B is operated in the rightward direction. The operation detection device accepts a forward slide operation on the operation unit 12B shown by arrow d2 in FIG. 5 as an operation of a forward movement of the whole vehicle seat shown by the arrow D2 in FIG. 6. With this, by an electric drive mechanism (not shown), the whole vehicle seat is caused to move forward when the operation unit 12B is operated to slide forward.

The sub operation unit 13 mounted on the surface side of the operation unit 12 is for operating the lumbar support placed on the backrest 3, formed by a cross-shaped key with directions corresponding to the forward, backward, upper, and lower directions of the vehicle, respectively, and configured so that it can be pressed and operated in any of the directions. Then, the operated direction by the sub operation unit 13 is detected by an operation detection device (not shown), and the operation is accepted as an operation of a direction to move the lumbar support. With this, when the sub operation unit 13 is pressed and operated in any of the forward, backward, upper, and lower directions, the lumbar support is caused to move in the operated direction by an electric drive mechanism (not shown). Even when the operation unit 12 is located either at the first operation position or at the second operation position, the operation of the sub operation unit 13 is accepted as the same operation on the lumbar support.

As described above, the seat switch device according to the present invention is configured so that the operation unit 12 is movable along the fore-and-aft direction of the vehicle, and is configured so that the operation target varies in accordance with the position of the operation unit 12. To be specific, in this example embodiment, when the operation unit 12 is located at the first operation position, which is on the back side of the vehicle, as shown in FIG. 3, the backrest 3 located at the back of the vehicle seat is the operation target, and various operations on the backrest 3 are allowed. Moreover, when the operation unit 12 is located at the second operation position, which is on the front side of the vehicle, as shown in FIG. 5, the sitting part 2 located in the front of the vehicle seat is the operation target, and various operations on the sitting part 2 are allowed. Since the seat switch device thus accepts an operation of the operation unit 12 as an operation on each of the components (for example, the backrest 3 and the sitting part 2) of the vehicle seat located corresponding to a positional relation (for example, a positional relation in the fore-and-aft direction of the vehicle) at each operation position of the operation unit 12, an operator who is a passenger can easily recognize an actuation portion corresponding to an operation.

Further, in the seat switch device 10 according to the present invention, an operation direction on the operation unit 12 corresponds to an actuation direction of the operation target. For example, when the operation unit 12 is operated in the fore-and-aft direction, the vertical direction, and the widthwise direction, the backrest 3 and the sitting part 2 are operated in the fore-and-aft direction, the vertical direction, and the widthwise direction, respectively. Therefore, an operator who is a passenger can easily recognize the actuation state of the operation target by an operation on the operation unit 12, and an operation is facilitated.

Although a case where an initial position (a reference position) of the operation position of the operation unit 12 is the first operation position and the operation unit 12 is moved from the position to the second operation position is described above, it is also possible to move the operation unit 12 from the second operation position to the first operation position. That is to say, the operation unit 12 can move back and forth between the first operation position and the second operation position. Besides, the initial position of the operation unit 12 may be the second operation position. Moreover, the initial position of the operation unit 12 may be a position between the first operation position and the second operation position, and the operation unit 12 may be moved from the position to the first operation position and the second operation position. In this case, for example, the operation unit 12 may be configured so that the position automatically returns to the initial position between the first operation position and the second operation position.

Although a case where the operation unit 12 is movable along the straight line in the fore-and-aft direction of the vehicle is illustrated above, the operation unit 12 may be configured to be movable in any direction, and is not necessarily limited to moving along the straight line.

Second Example Embodiment

Figure 7:
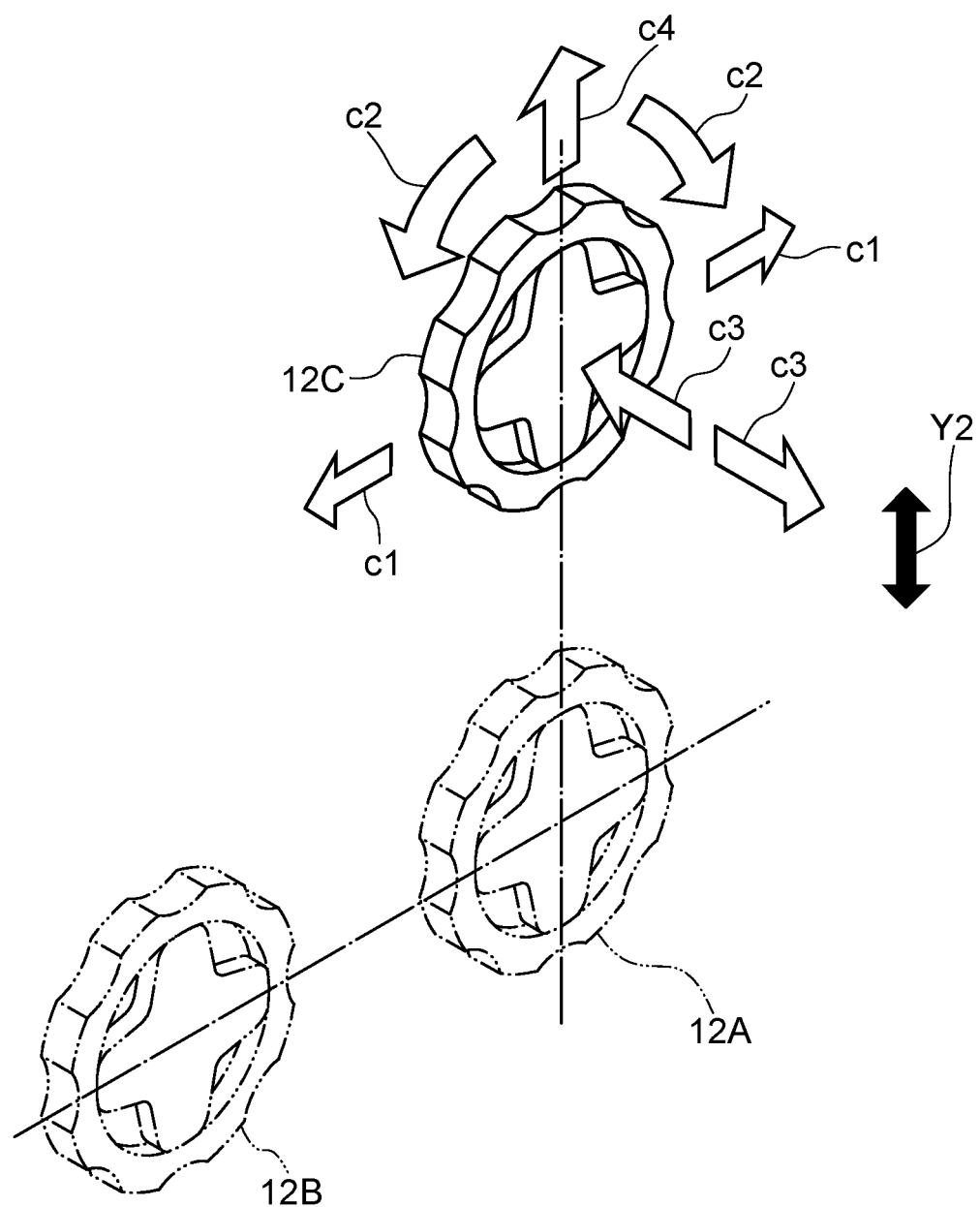
FIG. 7 is a view showing a way of an operation of a seat switch device in a second example embodiment of the present invention.
Figure 8:
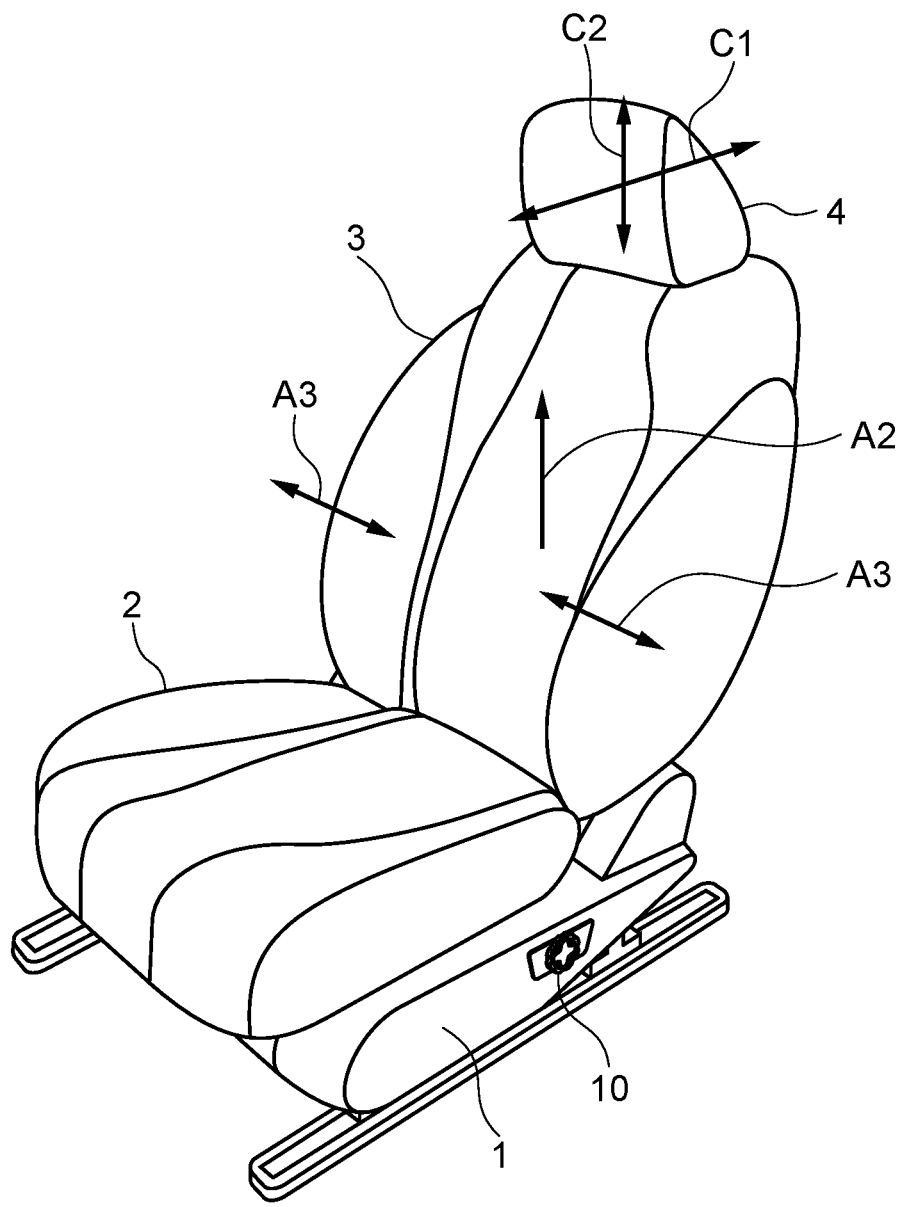
FIG. 8 is a view showing a motion of a vehicle seat by the operation of the seat switch device disclosed in FIG. 7.

Next, a second example embodiment of the present invention will be described with reference to FIGS. 7 and 8. FIGS. 7 and 8 are views for describing an operation of a seat switch device and a movement of a vehicle seat.

The seat switch device 10 in this example embodiment has substantially the same configuration as that in the first example embodiment described above and, in addition to the above configuration, the seat switch device is mounted so as to be movable in the vertical direction of the vehicle along the side surface of the base part 1 by a manual operation of an operator who is a passenger as shown by arrow Y2 in FIG. 7. Therefore, as shown by reference numeral 12C in FIG. 7, the operation unit 12 and the sub operation unit 13 mounted on the switch base 11 are configured to be located at a third operation position that is an operation position above the first operation position shown by reference numeral 12A. In the following, when located at the third operation position shown in FIG. 7, the operation unit 12 will be denoted by reference numeral 12C. In this example embodiment, since the operation unit 12 is movable upward from the first operation position denoted by reference numeral 12A, the upward movement of the backrest 3 shown by arrow A2 in FIG. 4 corresponding to the upward slide operation on the operation unit 12A shown by arrow a2 in FIG. 3 described in the first example embodiment is invalid.

When the operation unit 12C is located at the third operation position as shown in FIG. 7, the operation unit 12C can perform almost the same operations as in a case where the operation unit 12 is located at the first and second operation positions as well. That is to say, the operation unit 12C located at the third operation position shown in FIG. 7 is configured to be able to perform a fore-and-aft slide operation (a fore-and-aft operation) corresponding to the fore-and-aft direction of the vehicle shown by arrow c1, a rotation operation to rotate in a rotation direction corresponding to the vertical direction of the vehicle shown by arrow c2, and a widthwise operation that is an operation corresponding to the width direction, that is, the widthwise direction of the vehicle shown by arrow c3. The rotation operation shown by arrow c2 of the operation unit 12C is a rotation operation in which a rotation direction in the counterclockwise direction corresponds to the upward direction of the vehicle and a rotation direction in the clockwise direction corresponds to the downward direction of the vehicle.

Each operation on the operation unit 12C located at the third operation position described above is detected by an operation detection device (not shown), and the operation detection device accepts as an operation on the headrest 4 associated with the third operation position. That is to say, when the operation unit 12C is located at the third operation position, each operation on the operation unit 12C is accepted as an operation on the headrest 4 that is located on a side in a direction toward the third operation position (on a third direction side) from the first operation position with respect to the backrest 3 described above, and vice versa. When the operation unit 12 is located at the first operation position as described above, each operation on the operation unit 12 is accepted as an operation on the backrest 3 that is located on a side in a direction toward the first operation position (on the first direction side) from the third operation position with respect to the headrest 4.

To be specific, the operation detection device first accepts a slide operation in the fore-and-aft direction on the operation unit 12C shown by arrow c1 in FIG. 7 as an operation of the fore-and-aft position along the fore-and-aft direction of the vehicle on the headrest 4 shown by arrow C1 in FIG. 8. With this, by an electric drive mechanism (not shown), the headrest 4 is caused to move in the forward direction when the operation part 12C is operated to slide in the forward direction, and the headrest 4 is caused to move in the backward direction when the operation unit 12C is operated to slide in the backward direction. Moreover, the operation detection device accepts a rotation operation in the vertical direction on the operation unit 12C shown by arrow c2 in FIG. 7 as an operation of the height position along the vertical direction of the vehicle on the headrest 4 shown by arrow C2 in FIG. 8. With this, by an electric drive mechanism (not shown), the headrest 4 is caused to move in the upward direction when the operation unit 12C is operated to rotate in the counterclockwise direction corresponding to the upward direction, and the headrest 4 is caused to move in the downward direction when the operation unit 12C is operated to rotate in the clockwise direction corresponding to the downward direction. Moreover, the operation detection device accepts a slide operation in the upward direction on the operation unit 12C shown by arrow c4 in FIG. 7 as an upward movement operation on the backrest 3 shown by arrow A2 in FIG. 8, not on the headrest 4. With this, by an electric drive mechanism (not shown), the backrest 3 is caused to move in the upward direction when the operation part 12C is operated to slide in the upward direction. The operation detection device accepts an operation in the widthwise direction on the operation unit 12C shown by arrow c3 in FIG. 7 as an operation of the breadth in the width direction on the passenger support member of the backrest 3 shown by arrow A3 in FIG. 8, not on the headrest 4. However, the operation detection device may accept an operation in the widthwise direction on the operation unit 12 shown by arrow c3 in FIG. 7 as an operation to cause the headrest 4 to move in another direction.

As described above, the seat switch device in this example embodiment is configured so that the operation unit 12 can move along the vertical direction of the vehicle. The headrest 4 located on the upper side is an operation target when the operation unit 12 is located on the upper side, and the backrest 3 located on the lower side is an operation target when the operation unit 12 is located on the lower side. Thus, the seat switch device 10 accepts an operation of the operation unit 12 as an operation on each of the components (for example, the headrest 4 and the backrest 3) of the vehicle seat located corresponding to a positional relation (for example, a positional relation in the vertical direction of the vehicle) of the operation position of the operation unit 12, so that an operator who is a passenger can easily recognize an actuation portion corresponding to the operation.

Although a case where the operation position of the operation unit 12 can be moved to two or three positions has been described in the first and second example embodiments, the seat switch device 10 may be configured so that the operation unit 12 can move to more operation positions. In that case, with each of the operation positions at which the operation unit 12 is located, an operation target located corresponding to the positional relation of the operation position is associated.

<Supplementary Notes>

The whole or part of the example embodiments disclosed above can be described as the following supplementary notes. Below, the outline of the configuration of the seat switch device according to the present invention will be described. However, the present invention will not be limited to the following configurations.

(Supplementary Note 1)

A seat switch device performing an operation on a component of a seat for a vehicle, the seat switch device comprising an operation unit attached in a movable manner so as to be located at a plurality of operation positions, wherein the operation unit is configured to accept an operation input when the operation unit is located at each of the operation positions as an operation on each of the component of the seat for the vehicle located corresponding to a positional relation of the operation position.

(Supplementary Note 2)

The seat switch device according to Supplementary Note 1, wherein the operation unit is configured to accept an operation input when the operation unit is located at a first operation position as an operation on a first component, and accept an operation input when the operation unit is located at a second operation position that is different from the first operation position as an operation on a second component located on a side in a direction toward the second operation position from the first operation position with respect to the first component.

(Supplementary Note 3)

The seat switch device according to Supplementary Note 2, wherein the operation unit is attached so as to move along a substantially straight line, and is configured to accept an operation input when the operation unit is located at the first operation position that is an operation position in a first direction as an operation on the first component, and accept an operation input when the operation unit is located at the second operation position that is an operation position in a second direction that is an opposite direction to the first direction as an operation on the second component located on a side in the second direction with respect to the first component.

(Supplementary Note 4)

The seat switch device according to Supplementary Note 3, wherein the operation unit is configured to accept an operation input when the operation unit is located at the first operation position that is a reference position as an operation on the first component, and accept an operation input when the operation unit is moved in the second direction from the first operation position and is located at the second operation position as an operation on the second component.

(Supplementary Note 5)

The seat switch device according to Supplementary Note 3, wherein the operation unit is configured to accept an operation input when the operation unit is moved in the first direction from a reference position between the first operation position and the second operation position and is located at the first operation position as an operation on the first component, and accept an operation input when the operation unit is moved in the second direction from the reference position and is located at the second operation position as an operation on the second component.

(Supplementary Note 6)

The seat switch device according to any of Supplementary Notes 3 to 5, wherein the operation unit is attached so as to be further movable from the first operation position to a third operation position that is different from the first operation position and the second operation position, and is configured to accept an operation input when the operation unit is located at the third operation position as an operation on a third component located on a side in a direction toward the third operation position from the first operation position with respect to the first component.

(Supplementary Note 7)

The seat switch device according to any of Supplementary Notes 3 to 7, wherein:

the second component is arranged in a forward part of the vehicle with respect to the first component; and the operation unit is attached so as to be movable in a fore-and-aft direction in the vehicle, and is configured to accept an operation input when the operation unit is located at the first operation position that is a backward position of the vehicle as an operation on the first component, and accept an operation input when the operation unit is located at the second operation position that is a forward position of the vehicle with respect to the first operation position as an operation on the second component.

(Supplementary Note 8)

The seat switch device according to Supplementary Note 7, wherein the operation unit is configured to accept an operation input when the operation unit is located at the first operation position that is a reference position as an operation on the first component, and accept an operation input when the operation unit is moved to the forward position of the vehicle from the first operation position and is located at the second operation position as an operation on the second component.

(Supplementary Note 9)

The seat switch device according to Supplementary Note 7, wherein the operation unit is configured to accept an operation input when the operation unit is moved to the backward position of the vehicle from a reference position between the first operation position and the second operation position and is located at the first operation position as an operation on the first component, and accept an operation input when the operation unit is moved to the forward position of the vehicle from the reference position and is located at the second operation position as an operation on the second component.

(Supplementary Note 10)

The seat switch device according to any of Supplementary Notes 7 to 9, wherein:

the component includes a sitting part and a backrest of one seat for the vehicle; and the operation unit is attached so as to be movable in the fore-and-aft direction in the vehicle along a side surface of the seat for the vehicle, and is configured to accept an operation input when the operation unit is located at the first operation position as an operation on the backrest, and accept an operation input when the operation unit is located at the second operation position as an operation on the sitting part.

(Supplementary Note 11)

The seat switch device according to Supplementary Note 10, wherein:

the component further includes a headrest of the seat for the vehicle; and the operation unit is attached so as to be further movable toward an upper part of the vehicle from the first operation position along the side surface of the seat for the vehicle, and is configured to accept an operation input when the operation unit is located at an upward operation position with respect to the first operation position as an operation on the headrest.

(Supplementary Note 12)

The seat switch device according to any of Supplementary Notes 1 to 11, wherein the operation unit is configured to be capable of performing a plurality of operations, and is configured to accept a plurality of operations input when the operation unit is located at each of the operation positions as a plurality of operations on each of the component associated with the operation position.

(Supplementary Note 13)

The seat switch device according to Supplementary Note 12, wherein the operation unit is configured to be capable of performing a fore-and-aft operation that is an operation corresponding to a fore-and-aft direction in the vehicle, a widthwise operation that is an operation corresponding to a widthwise direction in the vehicle, and a vertical operation corresponding to a vertical direction in the vehicle, and is configured to accept the fore-and-aft operation as an operation to actuate the component in the fore-and-aft direction in the vehicle, accept the widthwise operation as an operation to actuate the component in the widthwise direction in the vehicle, and accept the vertical operation as an operation to actuate the component in the vertical direction in the vehicle.

(Supplementary Note 14)

The seat switch device according to Supplementary Note 12 or 13, wherein the operation unit has a substantially cylindrical shape, and is configured to be capable of performing a rotation operation, a radial-direction slide operation, and an axial-direction operation at the respective operation positions.

(Supplementary Note 15)

The seat switch device according to any of Supplementary Notes 7 to 11, wherein the operation unit is configured to be capable of further performing an operation to slide backward in the vehicle when the operation unit is located at the first operation position and accept the operation to slide backward as an operation to actuate the whole seat for the vehicle in a backward direction in the vehicle, and is configured to be capable of further performing an operation to slide forward in the vehicle when the operation unit is located at the second operation position and accept the operation to slide forward as an operation to actuate the whole seat for the vehicle in a forward direction in the vehicle.

Although the present invention has been described above with reference to the example embodiments and so on, the present invention is not limited to the example embodiments. The configurations and details of the present invention can be changed in various manners that can be understood by one skilled in the art within the scope of the present invention.

DESCRIPTION OF REFERENCE NUMERALS

1 base part
2 sitting part
3 backrest
4 headrest
10 seat switch device
11 switch base
12, 12A, 12B, 12C operation unit
13 sub operation unit

The invention claimed is:

1. A seat switch device performing an operation on a component of a seat for a vehicle, the seat switch device comprising an operation unit attached in a movable manner so as to be located at a plurality of operation positions, wherein the operation unit is configured to accept an operation input when the operation unit is located at a first operation position as an operation on a first component, and accept an operation input when the operation unit is located at a second operation position that is different from the first operation position as an operation on a second component located on a side in a direction toward the second operation position from the first operation position with respect to the first component, and wherein the operation unit is attached so as to move along a substantially straight line, and is configured to accept an operation input when the operation unit is located at the first operation position that is an operation position in a first direction as an operation on the first component, and accept an operation input when the operation unit is located at the second operation position that is an operation position in a second direction that is an opposite direction to the first direction as an operation on the second component located on a side in the second direction with respect to the first component.

2. The seat switch device according to claim 1, wherein the operation unit is configured to accept an operation input when the operation unit is located at the first operation position that is a reference position as an operation on the first component, and accept an operation input when the operation unit is moved in the second direction from the first operation position and is located at the second operation position as an operation on the second component.

3. The seat switch device according to claim 1, wherein the operation unit is configured to accept an operation input when the operation unit is moved in the first direction from a reference position between the first operation position and the second operation position and is located at the first operation position as an operation on the first component, and accept an operation input when the operation unit is moved in the second direction from the reference position and is located at the second operation position as an operation on the second component.

4. The seat switch device according to claim 1, wherein the operation unit is attached so as to be further movable from the first operation position to a third operation position that is different from the first operation position and the second operation position, and is configured to accept an operation input when the operation unit is located at the third operation position as an operation on a third component located on a side in a direction toward the third operation position from the first operation position with respect to the first component.

5. The seat switch device according to claim 1, wherein:

the second component is arranged in a forward part of the vehicle with respect to the first component; and the operation unit is attached so as to be movable in a fore-and-aft direction in the vehicle, and is configured to accept an operation input when the operation unit is located at the first operation position that is a backward position of the vehicle as an operation on the first component, and accept an operation input when the operation unit is located at the second operation position that is a forward position of the vehicle with respect to the first operation position as an operation on the second component.

6. The seat switch device according to claim 5, wherein the operation unit is configured to accept an operation input when the operation unit is located at the first operation position that is a reference position as an operation on the first component, and accept an operation input when the operation unit is moved to the forward position of the vehicle from the first operation position and is located at the second operation position as an operation on the second component.

7. The seat switch device according to claim 5, wherein the operation unit is configured to accept an operation input when the operation unit is moved to the backward position of the vehicle from a reference position between the first operation position and the second operation position and is located at the first operation position as an operation on the first component, and accept an operation input when the operation unit is moved to the forward position of the vehicle from the reference position and is located at the second operation position as an operation on the second component.

8. The seat switch device according to claim 5, wherein:

the component includes a sitting part and a backrest of one seat for the vehicle; and the operation unit is attached so as to be movable in the fore-and-aft direction in the vehicle along a side surface of the seat for the vehicle, and is configured to accept an operation input when the operation unit is located at the first operation position as an operation on the backrest, and accept an operation input when the operation unit is located at the second operation position as an operation on the sitting part.

9. The seat switch device according to claim 8, wherein:

the component further includes a headrest of the seat for the vehicle; and the operation unit is attached so as to be further movable toward an upper part of the vehicle from the first operation position along the side surface of the seat for the vehicle, and is configured to accept an operation input when the operation unit is located at an upward operation position with respect to the first operation position as an operation on the headrest.

10. The seat switch device according to claim 1, wherein the operation unit is configured to be capable of performing a plurality of operations, and is configured to accept a plurality of operations input when the operation unit is located at each of the operation positions as a plurality of operations on each of the component associated with the operation position.

11. The seat switch device according to claim 10, wherein the operation unit is configured to be capable of performing a fore-and-aft operation that is an operation corresponding to a fore-and-aft direction in the vehicle, a widthwise operation that is an operation corresponding to a widthwise direction in the vehicle, and a vertical operation corresponding to a vertical direction in the vehicle, and is configured to accept the fore-and-aft operation as an operation to actuate the component in the fore-and-aft direction in the vehicle, accept the widthwise operation as an operation to actuate the component in the widthwise direction in the vehicle, and accept the vertical operation as an operation to actuate the component in the vertical direction in the vehicle.

12. The seat switch device according to claim 10, wherein the operation unit has a substantially cylindrical shape, and is configured to be capable of performing a rotation operation, a radial-direction slide operation, and an axial-direction operation at the respective operation positions.

13. The seat switch device according to claim 5,
wherein the operation unit is configured to be capable of further performing an operation to slide backward in the vehicle when the operation unit is located at the first operation position and accept the operation to slide backward as an operation to actuate the whole seat for the vehicle in a backward direction in the vehicle, and is configured to be capable of further performing an operation to slide forward in the vehicle when the operation unit is located at the second operation position and accept the operation to slide forward as an operation to actuate the whole seat for the vehicle in a forward direction in the vehicle.

* * * * *